United States Patent Office 3,495,931
Patented Feb. 17, 1970

3,495,931
PROCESS FOR CRYSTALLIZING
POLYBENZIMIDAZOLES
Anthony B. Conciatori, 27 Orchard, Chatham 07928;
Edward C. Chenevey, 185 Martins Way, North Plainfield 07060; Herman D. Noether, 59 West Road, Short Hills 07078; and Michael Dunay, 363 Midway Ave., Fanwood 07023, all of New Jersey
No Drawing. Filed Jan. 14, 1966, Ser. No. 520,647
Int. Cl. D06m 13/38
U.S. Cl. 8—130.1                    13 Claims

ABSTRACT OF THE DISCLOSURE

A process is provided for increasing the crystallinity of polybenzimidazole fibers. The crystallinity is increased by contacting the fiber preferably at an elevated temperature with a reagent selected from the group consisting of benzyl alcohol, pyrrolidine, morpholine, pyridine, ethylene glycol, a phenolic compound, and a mixture of a phenolic compound with water. In a preferred embodiment of the invention crystallinity is imparted by pressuring a polybenzimidazole fiber in a mixture of a phenolic compound (e.g. phenol) and water at a pressure of 2 to 50 atmospheres e.g. 3 to 8 atmospheres) and a temperature of 150° C. to 350° C. (e.g. 200° C. to 300° C.).

---

This invention relates to the preparation of crystalline, oriented polybenzimidazole fibers.

Polybenzimidazoles are a known class of heterocyclic polymers. They are prepared and described in Patent Nos. 2,895,948 and 3,174,947, for example. A particularly interesting subclass of polybenzimidazoles for fiber production consists of recurring units of the formula:

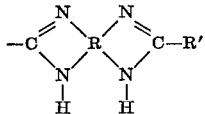

wherein R is an aromatic nucleus symmetrically tetra-substituted with nitrogen atoms forming the benzimidazole rings paired upon adjacent carbon atoms of the said aromatic nucleus and R' is a carbocyclic aromatic or alicyclic ring, an alkylene group or a heterocyclic ring. Examples of such heterocyclic rings include pyridine, pyrazine, furan, quinoline, thiophene and pyran. Preferred R groups are 3,3',4,4'-bi-phenylene

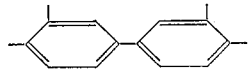

1,2,4,5-phenylene

and

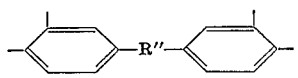

wherein R" is —O—, —S—,

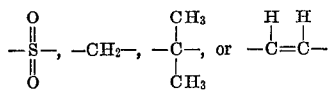

Examples of such polybenzimidazoles include poly-2,2'-pyridylene-3",5") - 5,5' - bibenzimidazole; poly-2,2'-furylene-2",5")-5,5'-bibenzimidazole; poly - 2,2' - naphthalene-1",6")-5,5'-bibenzimidazole; poly - 2,2' - diphenylene-4", 4''')-5,5'-bibenzimidazole; poly-2,2'-amylene-5,5'-bibenzimidazole, poly - 2,2'-octamethylene-5,5'-bibenzimidazole; poly-2',2''-hexamethylene - 5',5'' - di(benzimidazole) propane-2,2; poly-2,6-(p-phenylene)-diimidazobenzene; poly-2,2'-m-phenylene-5,5'-di(benzimidazole) ether and poly-2,2'-cyclohexenyl-5,5'-bibenzimidazole.

Polybenzimidazoles are characterized by a high degree of thermal stability. They may be shaped to form fibers, films and other shaped articles of wide utility which show great resistance to degradation by heat, hydrolytic media and oxidizing media.

Some of the polybenzimidazoles are crystalline as formed. However others, including some of those of greatest interest as potentially good fibers are not crystalline. See for example Patent No. 2,895,948, column 4, lines 24–31.

It is an object of the present invention to prepare a predominantly crystalline form of heretofore non-crystalline polybenzimidazoles.

It is a further object to convert predominantly amorphous polybenzimidazole fiber into oriented, crystalline polybenzimidazole fiber.

These objects have now been realized by the method of the present invention which broadly comprises treating amorphous polybenzimadazole fiber or yarn with certain reagents under appropriate conditions of temperature and concentration. A wide temperature range, including temperatures equal to or greater than necessary to maintain reflux can be used. Reagents which can accomplish these ends are benzyl alcohol, pyrrolidine, morpholine, pyridine, ethylene glycol, phenolic compounds, and a mixture of a phenolic compound with water.

Exemplary phenolic compounds include phenol, pyrogallol, bisphenols such as bis-o-phenyl phenol and alkylphenols containing 1 to 4 carbon atoms in the alkyl groups such as m-cresol. Phenol inself is the preferred phenolic compound. They should be present in an amount from 5 to 60%, preferably 10 to 25%, by weight of the combined waterphenolic compound media. With higher phenol concentrations, a structure is obtained, which although crystalline, is non-oriented and too brittle. Treatment with water-phenol in the proper proportions results in a crystalline structure having an X-ray pattern which is both crystalline and oriented, exhibiting superior fiber properties. Within the preferred range of phenol concentration an increase in phenol concentration tends to increase the percent crystallinity.

When employing a water-phenolic compound mixture as the reagent, the pressure should be from 2 to 50 atmospheres, preferably 3 to 8 atmospheres. The temperature should be from 150–350° C., preferably 200–300° C. Within this temperature range an increases in temperature tends to increase the percent crystallinity.

When using benzyl alcohol, pyrrolidine, morpholine, pyridine or ethylene glycol as the reagent, elevated temperatures up to their reflux temperatures at atmospheric pressure are most conveniently employed.

Table I illustrates the unobvious effects of the present invention. The exemplary polybenzimidazole shown is poly-2,2'-(m-phenylene)-5,5'-bibenzimidazole having the repeating unit

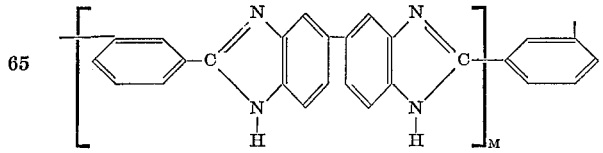

and can be prepared by the method disclosed in Example II of Patent No. 3,174,947. It has previously been reported to be amorphous (Iwakura et al. J. Polymer Science: part A, vol. 2, p. 2612 (1964) and Marvel, SPE Journal, March 1964, p. 224). A sample of this yarn dry spun from dimethylacetamide is drawn over a hot shoe at 400° C. at a 2:1 draw ratio to an oriented structure. The yarn is then placed in an autoclave mounted in a stainless steel support and kept taut by clamping the filaments at both ends. The yarn is then treated at 200° C. for two hours with (1) nothing, (2) phenol and (3) a mixture of water and phenol (14% by weight phenol).

Orientation and crystallinity are relative terms and are very difficult to determine as exact quantitative values. Hence the listing "no" designates a predominantly non-oriented or non-crystalline fiber while "yes" designates a predominantly oriented or crystalline fiber.

TABLE I

| Treatment: | Crystalline | Oriented |
| --- | --- | --- |
| None | No | Yes |
| Phenol | Yes | No |
| Phenol plus water | Yes | Yes |

Treatment with phenol gives a crystalline but non-oriented fiber which is very brittle, whereas the fiber from the phenol-water treatment is not brittle.

TABLE II

| Percent phenol | Heating cycle | Crystalline | Oriented | Denier | Elongation | Tenacity. g./d, |
| --- | --- | --- | --- | --- | --- | --- |
| Control, no treatment | | No | Yes | 7.9 | 18.4 | 4.46 |
| 14 | 2 hrs., 250° C | Yes | Yes | 8.3 | 39.5 | 2.62 |
| 14 | 4 hrs., 250° C | Yes | Yes | 8.8 | 43.6 | 2.76 |
| 20 | 2 hrs., 200° C | Low | Yes | 9.7 | 79.5 | 1.53 |
| 20 | 2 hrs., 250° C | High | Yes | 8.7 | 48.0 | 2.52 |

Table II illustrates the variation in fiber properties within the scope of the instant invention which can be effected by using different temperatures and concentrations of phenol. A similar sample of the oriented polybenzimidazole yarn used in Table I is here employed.

The crystallinity is increased by both the higher concentration of phenol and the higher temperature. After removal from the autoclave, the fiber is loose and relaxed and under no tension. This relaxation is shown in the slight increase in denier and decrease in tenacity and a considerable increase in elongation. The degree of crystallinity approximates that of cellulose triacetate and polyester fibers.

Other polybenzimidazoles which are amorphous in the solid state can be similarly treated by the process of the instant invention.

Similar achievement of crystallinity and retention of orientation resulting in improved fiber properties can be effected by employing (1) the other phenolic compounds in the same manner and (2) pyrrolidone, morpholine, pyridine, benzyl alcohol and ethylene glycol.

Crystallization by the method presently disclosed may also be effected after manufacture of a fiber assembly (fabric, webbing, etc.). In this way the fabrication strains resulting in internal stresses may be overcome and a much more efficient structure in terms of energy absorption produced.

Numerous other variations within the spirit of this invention will be apparent to one skilled in the art.

What is claimed is:

1. A process for increasing the crystallinity of a predominantly amorphous polybenzimidazole fiber comprising contacting said fiber with a reagent selected from the group consisting of benzyl alcohol, pyrrolidine, morpholine, pyridine, and a mixture of a phenolic compound with water containing about 5 to 60 percent by weight of the mixture of said phenolic compound, until predominantly crystalline polybenzimidazole fiber is formed; said contact with said reagent selected from the group consisting of benzyl alcohol, pyrrolidine, morpholine, and pyridine being carried out at an elevated temperature up to reflux temperature and at atmosphere pressure, and said contact with said mixture of a phenolic compound with water being carried out at a temperature of 150° C. to 350° C. and at a pressure of 2 to 50 atmospheres, and with said phenolic compound being selected from the group consisting of phenol, bis-phenols, pyrogallol, and alkyl phenols having 1 to 4 carbon atoms per alkyl group.

2. A process according to claim 1 wherein said phenolic compound is phenol.

3. A process according to claim 1 wherein said phenolic compound is an alkylphenol having 1 to 4 carbon atoms in the alkyl group.

4. A process according to claim 1 wherein said phenolic compound is pyrogallol.

5. A process according to claim 1 wherein said reagent is benzyl alcohol.

6. A process according to claim 1 wherein said reagent is pyrrolidine.

7. A process according to claim 1 wherein said polybenzimidazole fiber is oriented prior to contacting with said reagent.

8. A process according to claim 1 wherein said polybenzimidazole fiber is poly-2,2'-(meta-phenylene)-5,5'-bibenzimidazole.

9. A process according to claim 1 wherein said polybenzimidazole fiber is taut while contacted with said reagent.

10. A process according to claim 1 wherein said polydominantly amorphous oriented polybenzimidazole fiber comprising contacting said fiber while taut with a mixture of a phenolic compound with water at a pressure of 3 to 8 atmospheres and a temperature of 200° C. to 300° C. until a predominantly crystalline oriented polybenzimidazole fiber is formed; said phenolic compound being selected from the group consisting of phenol, bis-phenols, pyrogallol, and alkylphenols having 1 to 4 carbon atoms in the alkyl group, and present in concentration of about 10 to 25 percent by weight of said mixture.

11. A process according to claim 10 wherein said oriented polybenzimidazole fiber is poly-2,2'-(meta-phenylene)-5,5'-bibenzimidazole.

12. A process according to claim 11 wherein said phenolic compound is phenol.

13. A predominantly crystalline polybenzimidazole fiber formed in accordance with the process of claim 1.

References Cited

UNITED STATES PATENTS 3,174,947  3/1965  Marvel et al. _____ 260—78.4 X

OTHER REFERENCES

Vogel et al.: Polybenzimidazoles, new thermally stable polymers; Journal of Polymer Science, 1961, pp. 511, 513, 519, 521, 522.

LEON D. ROSDOL, Primary Examiner

M. HALPERN, Assistant Examiner

U.S. Cl. X.R.

260—47, 78

FO-1050
(5/69)

UNITED STATES PATENT OFFICE
CERTIFICATE OF CORRECTION

Patent No. 3,495,931          Dated March 5, 1970

Inventor(s) Anthony B. Conciatori, et al

It is certified that error appears in the above-identified patent and that said Letters Patent are hereby corrected as shown below:

Column 2, line 53 delete "increases" insert -- increase --.

Column 4, line 2 delete "atmosphere" insert --- atmospheric ---; line 41 delete "according to claim 1 wherein said poly "insert --- for increasing the crystallinity of a pre ---"

Signed and sealed this 28th day of July 1970.

(SEAL)
Attest:

EDWARD M. FLETCHER, JR.
Attesting Officer

WILLIAM E. SCHUYLER, JR.
Commissioner of Patents